US008719371B1

(12) United States Patent
Nerieri

(10) Patent No.: US 8,719,371 B1
(45) Date of Patent: May 6, 2014

(54) SYSTEMS AND METHODS FOR MANAGING MESSAGE DELIVERY BASED ON DEVICE ACTIVITY, USER BEHAVIOR, OR USAGE PATTERNS

(71) Applicant: Google Inc., Mountain View, CA (US)

(72) Inventor: Francesco Nerieri, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/633,628

(22) Filed: Oct. 2, 2012

Related U.S. Application Data

(60) Provisional application No. 61/664,030, filed on Jun. 25, 2012.

(51) Int. Cl.
G06F 15/16 (2006.01)
H04L 12/58 (2006.01)
(52) U.S. Cl.
CPC ............... H04L 51/06 (2013.01); H04L 51/18 (2013.01)
USPC ........................................................ 709/217
(58) Field of Classification Search
CPC .......... H04L 51/00; H04L 51/06; H04L 51/18
USPC ........................................................ 709/217
See application file for complete search history.

(56) References Cited

U.S. PATENT DOCUMENTS

| 7,689,256 | B2* | 3/2010 | Jin et al. ........................ 455/574 |
| 7,844,307 | B2* | 11/2010 | Henson et al. ................ 455/574 |
| 7,921,309 | B1* | 4/2011 | Isbister et al. ................ 713/300 |
| 7,974,849 | B1* | 7/2011 | Begole et al. .................. 705/1.1 |
| 8,036,718 | B2* | 10/2011 | Lencevicius et al. ......... 455/574 |
| 8,238,871 | B2* | 8/2012 | Jin et al. ..................... 455/404.1 |
| 8,271,107 | B2* | 9/2012 | Bodin et al. .................... 700/94 |
| 8,321,703 | B2* | 11/2012 | Berard et al. ................. 713/320 |
| 8,417,222 | B1* | 4/2013 | Nerieri et al. .............. 455/412.2 |
| 2007/0243862 | A1* | 10/2007 | Coskun et al. ................ 455/418 |
| 2012/0106724 | A1* | 5/2012 | Lorello et al. ........... 379/201.01 |
| 2012/0324091 | A9* | 12/2012 | Raleigh et al. ................ 709/224 |

* cited by examiner

Primary Examiner — Kristie Shingles
(74) Attorney, Agent, or Firm — Troutman Sanders LLP; James E. Schutz; Mark Lehi Jones

(57) ABSTRACT

The disclosed technology covers messaging systems and methods. An example messaging method includes receiving at a message server a plurality of messages for a plurality of computing devices, including a first computing device. A first set of the messages is identified as being directed to the first computing device, for which state information is received. A set of predetermined rules is applied to that state information. A return value is determined, with a computer processor, based on the application of the rules to the current state information. The first set of messages is then transmitted to the first computing device if the return value is a first value. Alternatively, the first set of messages is held for the time being if the return value is a second value.

19 Claims, 3 Drawing Sheets

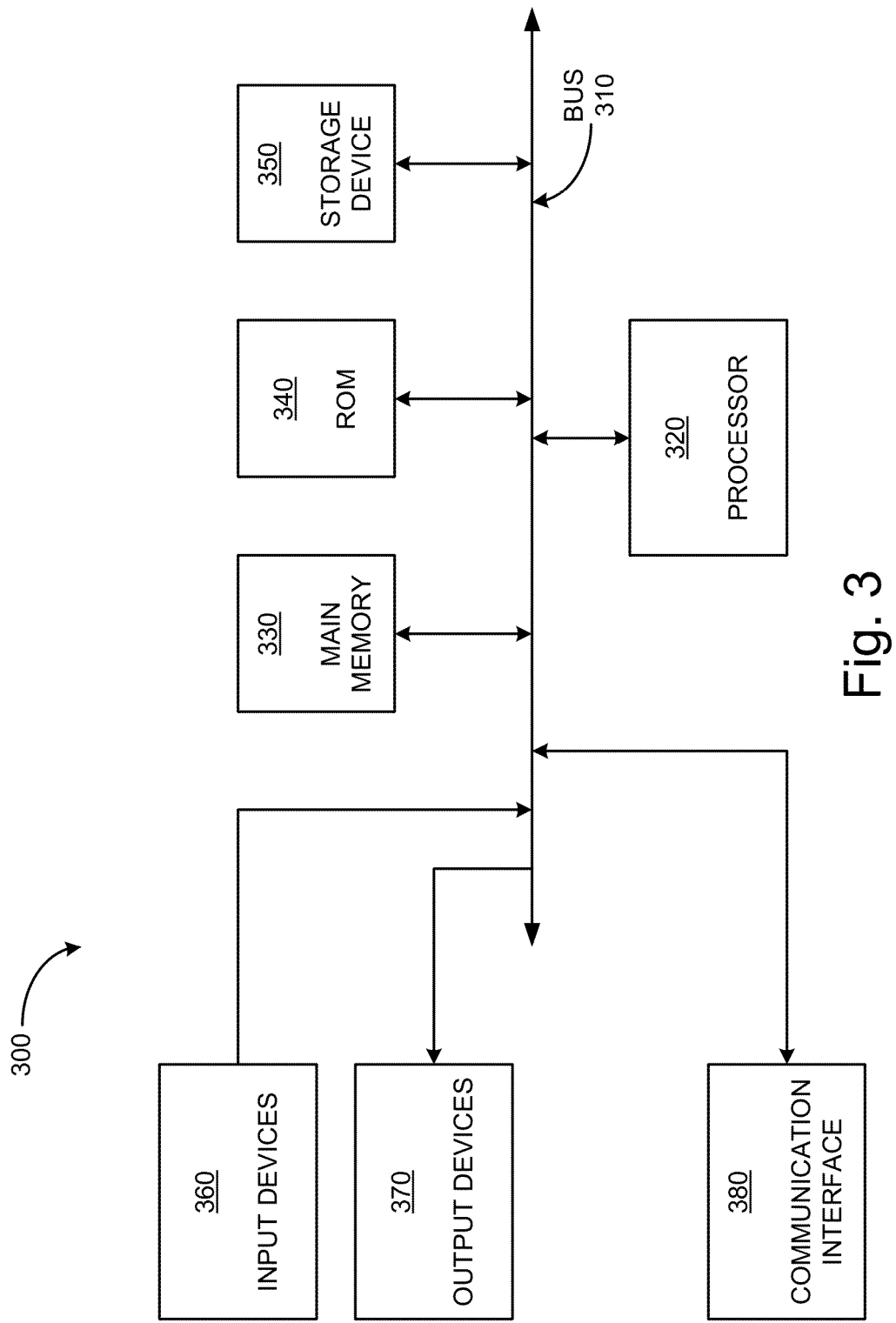

SYSTEMS AND METHODS FOR MANAGING MESSAGE DELIVERY BASED ON DEVICE ACTIVITY, USER BEHAVIOR, OR USAGE PATTERNS

CROSS-REFERENCE TO RELATED APPLICATIONS

The application claims priority and the benefit under 35 U.S.C. §119(e) of U.S. Provisional Patent Application No. 61/664,030, filed 25 Jun. 2012, which is incorporated herein by reference in its entirety as if fully set forth below.

TECHNICAL FIELD

Various aspects of the disclosed technology relate to push notifications and, more particularly, to managing push message delivery based on device activity.

BACKGROUND

Push notification services are in widespread use for sending messages to various computing devices, including mobile devices. For example, a push notification may be sent from an email server to a user's mobile device to notify the user of receipt of a new email message. Push services can reduce the required work of a mobile device by relieving the mobile device of the need to continuously check for new email or other new messages from remote servers.

A downside of push messaging is that a mobile device must be awake, i.e., powered up, in order to receive new messages. By delivering messages unprompted, a messaging server may repeatedly wake up a device, thus draining its battery power.

SUMMARY

Various implementations of the disclosed technology manage message delivery to computing devices to find a balance between preserving battery power and delivering messages as quickly as possible.

One example implementation of the disclosed technology is a messaging method that includes receiving at a message server a plurality of messages for a plurality of computing devices, including a first computing device. A first set of the messages may be identified as being directed to the first computing device, for which state information is received. A set of predetermined rules may be applied to that state information, wherein at least one of the rules is related to frequency of use of the first computing device. A return value may be determined, with a computer processor, based on the application of the rules to the current state information. The first set of messages may then be transmitted to the first computing device if the return value is a first value. Alternatively, the first set of messages may be held for the time being if the return value is a second value.

Another example implementation is a computer program product embodied in a non-transitory computer-readable medium, the computer program product having an algorithm adapted to effectuate a method. According to the method, a plurality of messages is received that are directed toward a mobile device. State information about the mobile device may be received from the mobile device, where that state information includes a current power state of the mobile device. A set of predetermined rules may be applied to the state information and the plurality of messages, yielding a return value. The return value may then be interpreted as an instruction as to whether to transmit the plurality of messages to the mobile device. It may be determined to delay transmission of the plurality of messages to the mobile device if the return value is a first value. The plurality of messages may be transmitted to the mobile device if the return value is a second value.

Another implementation of the disclosed technology is a messaging system comprising a messaging server, a storage medium comprising a plurality of predetermined rules, and a communication interface. The messaging server may be configured to receive a plurality of messages, to identify one or more of messages as being directed to a first computing device, and to receive a current state of the first computing device. The predetermined rules, which may be prioritized, may include at least one rule related to a time of day or location of the first computing device. The messaging system may be further configured to apply the predetermined rules to the current state of the first computing device to yield a return value. The communication interface may be configured to transmit the one or more messages to the first computing device if the rule application yields a predetermined first return value. The messaging server may repeatedly apply the predetermined rules and hold the one or more messages until the rule application yields the first return value.

These and other objects, features, and advantages of the messaging systems and methods will become more apparent upon reading the following specification in conjunction with the accompanying drawing figures.

BRIEF DESCRIPTION OF THE FIGURES

FIG. 3 is a diagram of an architecture of a messaging server, according to an implementation of the disclosed technology.

DETAILED DESCRIPTION

Figure 1:
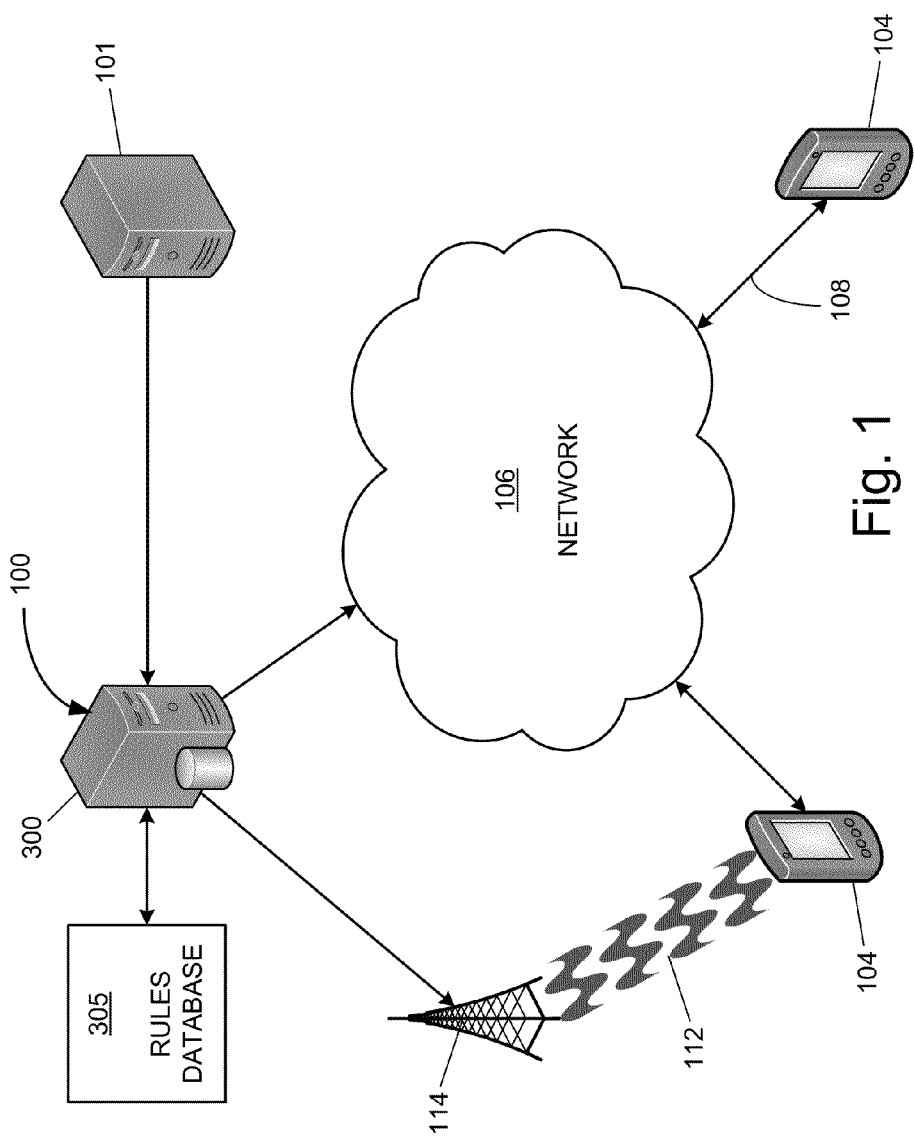
FIG. 1 is a block diagram of an illustrative messaging system, according to an implementation of the disclosed technology.

To facilitate an understanding of the principles and features of the disclosed technology, illustrative implementations are explained below. Various implementations of the disclosed technology are messaging systems and methods for batching data to be delivered to mobile devices, so as to balance battery life of the mobile devices with fast message delivery. In particular, implementations of the messaging system are described in the context of being used for messaging on mobile devices, such as a smartphone or tablet. Implementations of the disclosed technology, however, are not limited to this context. Rather, implementations may manage message delivery for various types of computing devices, as opposed to just traditional "mobile" devices, that may benefit from improved power management.

The components described hereinafter as making up various elements of the disclosed technology are intended to be illustrative and not restrictive. Many suitable components that would perform the same or similar functions as components described herein are intended to be embraced within the scope of the messaging systems and methods. Such other components not described herein may include, but are not limited to, for example, components developed after development of the disclosed technology.

Many mobile devices currently use push messaging to receive data. A push message is data transmitted to the mobile device without prompting, or without the mobile device first having to check for messages. A message may be directed to a mobile device from, for example, an application server remote from the mobile device. In some instances, the message may be transmitted from the application server to a messaging server, which may manage message delivery for a plurality of mobile devices receiving push messages from a plurality of sources.

In conventional messaging systems, push messages are transmitted from the messaging server to the recipient mobile devices upon receipt of the messages at the messaging server. This generally occurs without purposeful delay. As a result, mobile devices receive their messages efficiently, without having to prompt the messaging server to determine whether messages are waiting. A drawback of conventional messaging systems is that transmitting messages requires turning on a radio of the mobile device, which may drain the battery.

The disclosed technology recognizes that messages need not always be delivered immediately. A messaging system of the disclosed technology may hold received messages at the messaging server until one or more predetermined conditions are met, or according to one or more predetermined rules. These rules may be based on various factors relating to the state, or status, of the computing device to receive the messages, including, for example, user location, characteristics of the mobile device to receive the messages, or user activity.

Referring now to the figures, in which like reference numerals represent like parts throughout the views, various implementations of the messaging systems and methods will be described in detail.

FIG. 1 is a block diagram of an illustrative messaging system 100 according to the disclosed technology. The messaging system 100 may be embodied, in whole or in part, in a messaging server 300 in communication with one or more application servers 101. The messaging server 300 may be or include a computer system, such as that illustrated in FIG. 3.

The messaging server 300 may receive messages from the application server 101, and may communicate the received messages to computing devices 104, such as a mobile device or desktop or laptop computer, by push messages. It will be understood that there are numerous categories of mobile devices 104 that can run on batteries and may therefore benefit from the disclosed technology. For example, mobile devices 104 can include, but are not limited to, portable computers, tablets, Internet tablets, personal data assistants, ultra mobile personal computers, and smartphones.

The application servers 101 may be servers supporting applications installed on, or running on, the computing devices 104. Occasionally, an application server 101 may transmit a data message for use in its corresponding application on a computing device 104. It will be understood that a message need not be an email or a text message, but may alternatively be various types of data delivered to the mobile device as a transmission from a remote device. For example, and not limitation, the application server 101 may be associated with a weather application, and may transmit weather updates to the computing device 104. For another example, the application server may be associated with an electronic mail application, and may transmit email messages to the computing device 104. Messages from the application server 101 may be delivered by way of the messaging server 300, which may manage delivery according to the disclosed technology, as will be described further below.

The messaging server 300 may communicate with the computing device 104 in various ways. For example, the messaging server 300 may communicate with the computing device 110 through a Wi-Fi channel or another Internet connection 108, and may utilize a network 106 for communication with the computing device 104. For another example, the messaging server 300 may communicate to the computing device 104 through a service provider 114, such as a cellular service provider or other network provider supporting mobile devices. The service provider 114 may provide cellular service through cellular radio channels 112 for communicating with the mobile device 104. In that case, the messaging server 300 may communicate or send messages to the mobile device 104 through the service provider 114.

The messaging server 300 may be in communication with a plurality of computing devices 104 belonging to a plurality of users. Further, the messaging server 300 may receive a plurality of messages for the various computing devices 104. The messaging server 300 may sort the received messages and associate each message with its intended recipient computing device 104. Instead of delivering all messages to the recipient computing devices 104 immediately upon receipt, however, the messaging server 300 may batch the messages for each computing device 104.

The messaging server 104 may determine when to send a batch of messages to its corresponding, recipient computing device by applying a set of one or more delivery rules, which may be stored in a rules database 305 as shown in FIG. 1. The rules may be designed to consider device activity and user behavior when determining when to deliver messages. It will be understood that the rules database need not be a relational database, but may instead use various methods of data organization accessible by the messaging system 300.

In an example implementation, the messaging server may have access to state, or status, information related to the computing device 104. The computing device 104 may send information about its current state to the messaging server 300. The information may be sent either at the prompting of the messaging server 300 or, alternatively, autonomously by the computing device 104. For example, and not limitation, the computing device 104 may send to the messaging service 300 information about its current battery level, whether the computing device 104 is fully charged or is plugged into an external power source, whether the radio is currently active, current location, the type of network on which the computing device 104 is being used (e.g., Wi-Fi, 3G, 4G), whether it is unlocked or currently in use, or whether it just became in use.

Some information about the computing device's state may not be unique to a particular computing device 104, and the messaging server 300 may have access to that type of information from other sources or by retaining past data about the computing device 104. For example, and not limitation, the messaging server 300 may also have information about the current date, time of day, and past usage patterns of the computing device 104 in question as well as other computing devices 104 in the local area of the computing device 104.

For each computing device 104, the messaging server 300 may collect the messages directed to that computing device 104 and send those messages in batches, based on the type of messages in question or based on application of the rules to that computing device's current state. The rules may be applied to each computing device 104 individually, or to groups of computing devices 104 deemed to be similar in state. In some implementations, the rules may be provided in advance, such as by a system administrator, but in other implementations, one or more rules may be generated or modified dynamically based on historical data related to usage history of the computing devices 104 to which they apply. For example, and not limitation, if a particular computing device is, according to historical data, generally not in use between certain hours, such as between 10:00 pm and 6:00 am, then messages may be withheld at the messaging server 300 during that time period. A rule may be applicable to a single computing device 104 or to two or many computing devices 104, so that each computing device 104 may, in some implementations, be associated with its own corresponding set of rules.

For example, and not limitation, rules in the rules database 305 may include one or more of the following: (1) Deliver messages immediately if the computing device 104 is plugged into an outlet or other external power source. (2) Deliver messages immediately if the computing device 104 is fully charged. (3) Deliver messages immediately if the computing device 104 has been turned on frequently (e.g., a predetermined number of times within a predetermined time period). (4) Deliver messages immediately when the radio is up. (5) Immediately deliver text messages or other messages deemed to be important or high priority. (6) Hold messages if the battery is low and the radio is down. (7) Hold messages if the computing device 104 has not been turned on within a predetermined time period. (8) Hold messages during certain hours if the computing device 104 has not been turned on within a predetermined time period. (9) Continue delivering messages immediately for a predetermined time period, after a batch of messages is delivered, where the time period is based on the network type on which the computing device 104 operates.

Application of the rules to the computing device's current state may yield a Boolean response or return value, such as 0 or 1, yes or no, or deliver or don't deliver. The messaging server 300 may interpret the return value as an instruction as to whether the messages are to be delivered immediately or held for the time being. In an example implementation, the rules may be prioritized, such as by the rules database 305 or by the messaging server 300, and may be considered by the messaging server 300 in a predetermined order. Thus, rules encapsulating the greatest concerns may be considered before less important rules. In some implementations, each individual rule may include a condition and a potential return value, where the return value is the delivery indication provided to the messaging server 300 if that rule is considered during rule application and its corresponding condition is deemed to be true.

The example rules presented above may be used to balance battery usage with fast message delivery. While the computing device 104 is plugged in, and in some cases when the computing device 104 is fully powered, battery usage is of little concern. In that case, it makes sense to deliver all messages right away. Likewise, if the computing device 104 has been turned on frequently, then the user may be expecting a message, and messages should be delivered promptly. In contrast, if battery power is low, then battery optimization may be given high priority, so messages may be delayed, for example, until the user turns the computing device 104 on and therefore makes the choice to use the battery. Similarly, if the computing device has not been turned on in a while, then the user is most likely not expecting or checking messages, and it may be safe to assume that any delivered message would not be seen right away. This may be especially true during late night hours of weekdays when many people are likely to be asleep. Thus, holding onto messages may be a preferred decision in these cases.

Regarding the example Rule 8 above, in some computing devices 104, the radio stays up for a predetermined time period that is based on the network type on which the computing device 104 is operating. For example, this time period may be different when a computing device 104 is connected to cellular network, as compared to Wi-Fi. Thus, the battery power is only minimally impacted by continuing to transmit messages for a time period that is based on the radio-up time associated with the network type, as the radio will remain up regardless of whether messages are being sent. As a result, this example rule may encourage fast message delivery at a time when battery power would not be significantly impacted.

Figure 2:
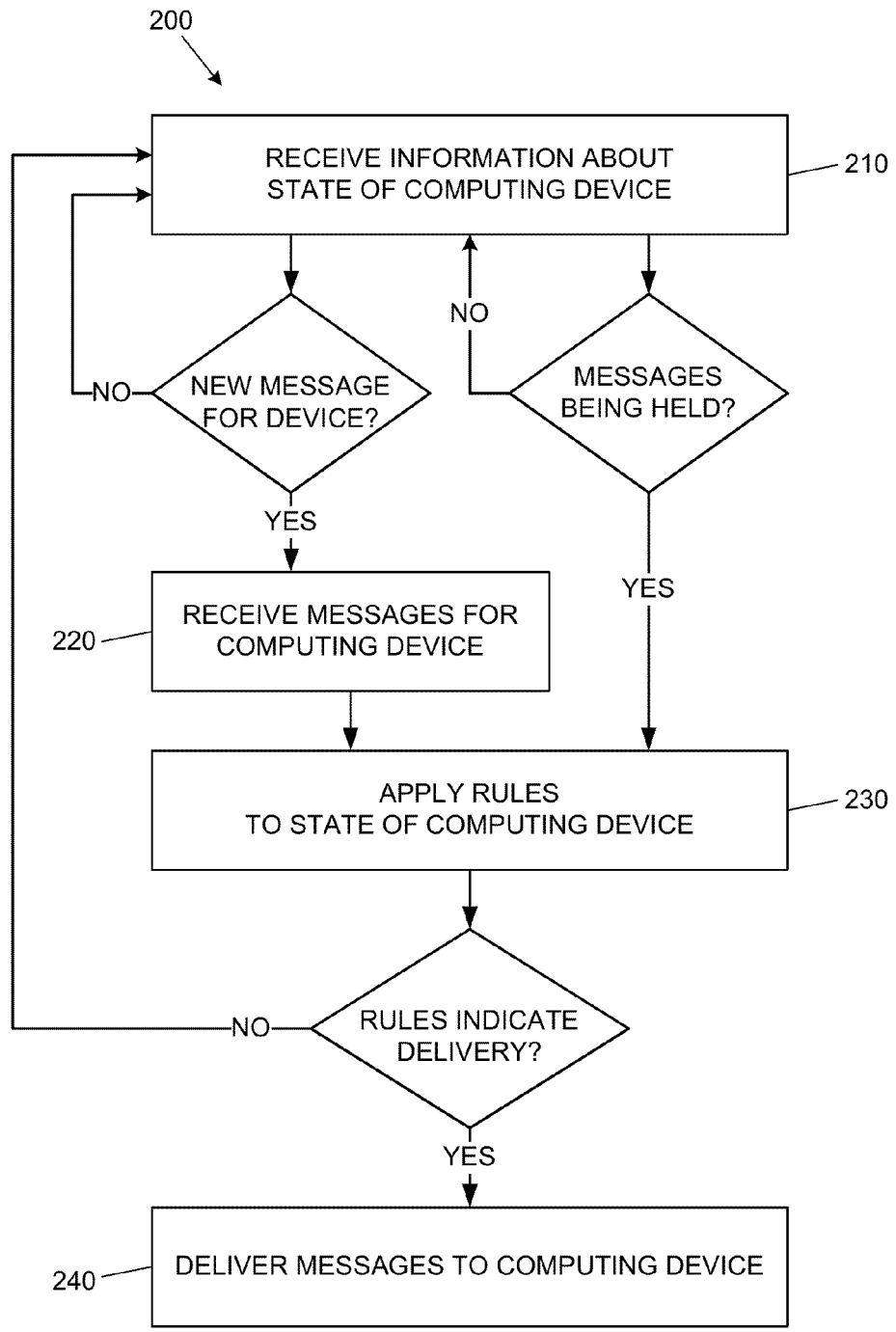
FIG. 2 is a flow diagram of a method for managing message delivery, according to an implementation of the disclosed technology.

FIG. 2 illustrates a flow diagram of a method 200 according to the disclosed technology. As shown, at 210, information about the state of the computing device 104 is received. This may happen repeatedly as new state information is transmitted from the computing device 104. At 220, one or more messages are received for the computing device 104. If other messages are being held for the computing device, then the newly received messages may be added to those. At 230, if a new message has been received or if old messages are awaiting delivery to the computing device 104, the rules are applied to the last-received state of the computing device 104 to determine whether the messages for the computing device 104 should be delivered. If the rules indicate that the messages should not be delivered yet, then the method 200 returns to 210 to await a state change for the computing device 104. On the other hand, if the rules indicate that messages should be delivered, then at 240, messages awaiting delivery to the computing device 104 may be transmitted to the computing device 104. Then, the method 200 may continue to receive state updates from the computing device 104.

It will be understood that the various steps shown in FIG. 2 are illustrative only, and that steps may be removed, other steps may be used, or the order of steps may be modified. It will also be understood that state updates from the computing device 104 may be received at various points throughout the method 200, especially if provided autonomously by the computing device 104.

Various implementations of the messaging systems 100 and methods may be embodied in non-transitory computer readable media for execution by a computer processor. FIG. 3 is a diagram of an example architecture of a messaging server 300, in an implementation consistent with the disclosed technology. As shown, the messaging server 300 may include a bus 310, a processor 320, a main memory 330, a read only memory (ROM) 340, a storage device 350, one or more input devices 360, one or more output devices 370, and a communication interface 380. The bus 310 may include one or more conductors that permit communication among the components of the messaging server 300.

The processor 320 may be one or more conventional processors or microprocessors that interpret and execute instructions, such as instructions for providing aspects of the disclosed technology. The main memory 330 may include a random access memory (RAM) or another dynamic storage device that stores information and instructions for execution by the processor 320. The ROM 340 may include a conventional ROM device or another type of static storage device that stores static information or instructions for use by the processor 320. The storage device 350 may include a magnetic or optical recording medium and its corresponding drive.

The input devices 360 may include one or more mechanisms that permit an operator to input information to the messaging server 300, such as a keyboard, a mouse, a pen, voice recognition, or biometric mechanisms. The output devices 370 may include one or more mechanisms that output information to an operator, including a display, a printer, or a speaker. The communication interface 380 may include any transceiver-like mechanism that enables the messaging server 300 to communicate with remote devices or systems, such as a mobile device or other computing device 104 to which messages are delivered. For example, the communication interface 380 may include mechanisms for communicating over a network.

As discussed above, the messaging server 300 may manage message delivery to a plurality of computing devices 104. The messaging server 300 may perform tasks to that end in response to the processor 320 executing software instructions contained in a computer-readable medium, such as memory 330. The software instructions may be read into memory 330 from another computer-readable medium, such as the data storage device 350, or from another device via the communication interface 380. Alternatively, or additionally, hardwired circuitry may be used in place of or in combination with software instructions to implement processes consistent with the disclosed technology. Thus, the disclosed technology is not limited to any specific combination of hardware circuitry and software.

While the messaging systems 100 and methods have been disclosed in illustrative examples, it will be apparent to those skilled in the art that many modifications, additions, and deletions may be made without departing from the spirit and scope of the systems, methods, and their equivalents, as set forth in the following claims.

What is claimed is:

1. A computer-implemented method comprising:
receiving at a message server a plurality of messages for a plurality of computing devices, including a first computing device;
identifying a first set of the messages as being directed to the first computing device; receiving, at the message server, current state information related to the first computing device, from the first computing device, wherein the current state information comprises a power state of the first computing device, wherein the power state is indicative of whether the first computing device is plugged into an outlet or is fully charged;
applying a set of predetermined rules to the current state information, wherein at least one of the predetermined rules is related to the power state of the first computing device;
determining, with a computer processor, a return value based on application of the rules to the current state information;
transmitting the first set of messages to the first computing device if the return value is a first value; and
holding, at the message server, the first set of messages if the return value is a second value.

2. The computer-implemented method of claim 1, wherein the return value varies based on the time of day of the first computing device.

3. The computer-implemented method of claim 1, wherein the return value varies based on the current location of the first computing device.

4. The computer-implemented method of claim 1, wherein the return value varies based on the type of messages in the first set of messages.

5. The computer-implemented method of claim 1, wherein the return value varies based on whether the computing device is connected to an external power source.

6. The computer-implemented method of claim 1, wherein the current state information further comprises a frequency of use of the first computing device, wherein at least one of the predetermined rules is based on the frequency of use.

7. The computer-implemented method of claim 6, wherein at least one of the predetermined rules indicates that the first set of messages should be transmitted, and not held, if the radio state is active.

8. The computer-implemented method of claim 1, wherein at least one of the predetermined rules indicates that the first set of messages should be transmitted, and not held, for a predetermined time period that is based on a type of network to which the computing device is connected.

9. A computer-readable storage medium that stores instructions, that when executed by one or more processors of a computing system, cause the computing system to perform a method, the method comprising:
receiving a plurality of messages directed toward a mobile device;
receiving state information about the mobile device, from the mobile device, including a power state of the mobile device, wherein the power state is indicative of whether the first computing device is plugged into an outlet or is fully charged;
applying a set of predetermined rules to the state information and the plurality of messages to yield a return value;
interpreting the return value as an instruction as to whether to transmit the plurality of messages to the mobile device;
determining to delay transmission of the plurality of messages to the mobile device if the return value is a first value; and
transmitting the plurality of messages to the mobile device if the return value is a second value.

10. The computer-readable storage medium of claim 9, wherein receiving state information about the mobile device comprises detecting whether the mobile device is connected to an external power source, and wherein the return value is at least partially dependent on whether the mobile device is connected to an external power source.

11. The computer-readable storage medium of claim 9, wherein receiving state information about the mobile device comprises detecting a radio state of the mobile device, and wherein the return value is at least partially dependent on whether the radio state of mobile device is active.

12. The computer-readable storage medium of claim 9, wherein the return value is at least partially dependent on the types of messages in the plurality of messages.

13. The computer-readable storage medium of claim 9, the method further comprising repeating multiple times the actions of:
receiving state information about the mobile device, from the mobile device; and
applying the set of predetermined rules to the state information and the plurality of messages to update the return value.

14. The computer-readable storage medium of claim 9, the method further comprising transmitting one or more previously held messages directed to the mobile device, when transmitting the plurality of messages.

15. A messaging system comprising:
a messaging server configured to receive a plurality of messages, to identify one or more of messages as being directed to a first computing device, and to receive information related to a current state of the first computing device, wherein the current state comprises a power state of the first computing device, wherein the power state is indicative of whether the first computing device is plugged into an outlet or is fully charged;
a storage medium comprising a plurality of predetermined rules for prioritization, wherein at least one of the predetermined rules is related to the power state of the first computing device, and wherein the messaging server is further configured to apply the predetermined rules to the current state of the first computing device to yield a return value; and a communication interface configured to transmit the one or more messages to the first computing device if the rule application yields a predetermined first return value, wherein the messaging server repeatedly applies the predetermined rules and holds the one or more messages until the rule application yields the first return value.

16. The messaging system of claim 15, wherein a first rule of the predetermined rules comprises a condition and a potential return value, and wherein the potential return value becomes the return value if the first rule is considered and its corresponding condition is deemed to be true.

17. The messaging system of claim 15, wherein application of the predetermined rules yields a different return value based on the time of day of the first computing device.

18. The messaging system of claim 15, wherein application of the predetermined rules yields a different return value based on the types messages in the one or more messages.

19. The messaging system of claim 15, the plurality of predetermined rules being customized to the first computing device.

* * * * *